United States Patent [19]

Yamazaki et al.

[11] 4,308,297

[45] Dec. 29, 1981

[54] METHOD OF MANUFACTURING FLUORESCENT LAMPS

[75] Inventors: Hitoshi Yamazaki; Hiroshi Ito; Sadaharu Doi; Jun Imai; Hiroshi Takada, all of Kamakura, Japan

[73] Assignee: Mitsubishi Denki Kabushiki Kaisha, Tokyo, Japan

[21] Appl. No.: 127,522

[22] Filed: Mar. 5, 1980

[30] Foreign Application Priority Data

Mar. 12, 1979 [JP] Japan .................................. 54/28366

[51] Int. Cl.$^3$ ...................... H01J 61/46; C09K 11/02; B05D 3/02; H01J 9/22

[52] U.S. Cl. ........................................ 427/67; 427/73; 427/372.2; 427/384

[58] Field of Search .................................... 427/67, 73

[56] References Cited

U.S. PATENT DOCUMENTS 4,121,132 10/1978 Repsher ............................ 427/67 X 4,230,741 10/1980 Yamazaki et al. .................... 427/67

FOREIGN PATENT DOCUMENTS 1441900 7/1976 United Kingdom .

*Primary Examiner*—James R. Hoffman

*Attorney, Agent, or Firm*—Wenderoth, Lind & Ponack

[57] ABSTRACT

A phosphor suspension is prepared by adding to an aqueous solution of a polyethylene oxide, a phosphor, a phosphate or a borate of an alkali metal and a phosphor bonding agent. After having passed through a filter, the phosphor suspension flows down on the inner surface of a glass bulb of a fluorescent lamp to form a phosphor layer thereon. The coated bulb is heated to a temperature which is not higher than its softening temperature while it is transported along two opposite guide rails by two endless conveyors by having both end portions supported by associated guide tips on the conveyors projecting above the guide rails.

7 Claims, 12 Drawing Figures

METHOD OF MANUFACTURING FLUORESCENT LAMPS

BACKGROUND OF THE INVENTION

This invention relates to a method of manufacturing fluorescent lamps.

Lately, energy costs have steeply risen due to a great drain upon resources, environmental problems etc. so that it is required in industrial circles to reconsider the conventional productional structure aimed principally at mass production and to improve the overall production efficiency by taking account of the saving of resources and energy. In order to meet this requirement of the times, various countermeasures have also been taken in the production of fluorescent lamps.

For example, as solvents for the phosphor suspension, expensive organic solvents have been previously employed, but as an example of the countermeasures, there can be mentioned the developement of a method using water which is abundant in the sense of resources and also inexpensive.

However, this method, that is, the method of forming phosphor coatings by using an aqueous phosphor suspension has the disadvantage that, when used with high speed mass production apparatus, a great obstruction is caused by bubbling which has not been a problem with organic solvents so that an increase in defective coatings and the deterioration of the exterior quality due to the generation of bubbles cannot be avoided completely.

On the other hand, what consumes the most energy among the steps of manufacturing fluorescent lamps is the step of baking the phosphor layers. This step aims at the decomposition and removal of a binder which is a high molecular weight organic material required for the formation of phosphor films, by heating and baking it after the particular phosphor layer has been formed and the heating temperature is determined by the decomposition characteristics of the binder used. Where the phosphor layer is formed by using an organic solvent, either nitrocellulose or ethylcellulose is used as the binder. In order to decompose it completely, heating at 600° C. or more is required, such a temperature approximating the softening temperature of the glass bulbs used. As a result, in the step of baking the phosphor layer, there is adopted a system by which a glass bulb rides on a pair of juxtaposed metallic rollers having surfaces coated with a refractory material and passes through a heating furnace while the rollers are rotating. Therefore, a heat loss due to the rollers is extremely large, thus greatly decreasing the thermal efficiency of the heating furnace. This causes a large amount of thermal energy to be consumed.

In order to reduce a quantity of energy consumed in this baking step, it is the indispensable requirement to improve the thermal efficiency of a baking device. The most effective method is to use a binder which can be completely decomposed and removed at a low heating temperature so as not to deform the glass bulb and to make a system not using rollers which are high in heat capacity as the means for transferring glass bulbs through the baking device. However, with phosphor layers formed of the phosphor suspension by using an organic solvent, there are not suitable binders which meet the above-mentioned requirement, and accordingly there has not been found effective means for reducing energy in the baking step.

However, as the use of water soluble phosphor suspensions has recently been generalized as described above, a range within which binders can be selected becomes very wide and various binders or water-soluble high molecular weight organic materials have been discussed. Among them it has been possible to use those binders which are completely decomposed and removed by heating to a temperature on the order of 500° C., for example, using polyethylene oxides or fatty acid esters thereof as binders. When phosphor layers are formed with aqueous lacquers including such binders, the baking temperature can be selected to be somewhat lower than a temperature at which the associated glass bulbs are deformed (i.e. below the softening temperature of the glass). This eliminates a fear that the glass bulbs will be deformed during the baking step. Accordingly, it is possible to use a baking furnace which is quite different from those of the conventional type. In the conventional prior art baking step, the decomposition and removal of the binders is completely accomplished but when baked at a temperature on the order of 500° C., the baked phosphor layers have extremely weak adhesion to the glass surface and the percentage of defective lamps increases due to the exfoliation of the phosphor layers. By considering the merits and demerits as a whole, there have arisen new problems in that a loss due to a decrease in yield is rather in excess of the advantage that the amount of energy consumed in the baking step is decreased.

Accordingly, it is an object of the present invention to provide a new and improved method of manufacturing fluorescent lamps which makes it possible to sharply decrease the amount of energy consumed in the step of baking phosphor layers without adversely affecting the quality of lamps and yields in the manufacturing steps during the manufacture of fluorescent lamps.

SUMMARY OF THE INVENTION

The present invention provides a method of manufacturing fluorescent lamps, comprising the steps of preparing a phosphor suspension by adding to an aqueous solution of a polyethylene oxide or a fatty acid ester a phosphor and an adhesion reinforcing agent consisting of a phosphate and/or a borate of an alkali metal, passing the phosphor suspension through a filter having meshes of from 50 to 200μ, injecting and coating on the inner surface of a glass bulb the phosphor suspension passed through the filter, to form a phosphor layer thereon, and heating and baking the phosphor layer on the inner surface of the glass tube at a temperature which is not higher than the softening temperature of the glass bulb while supporting one portion of the glass bulb. As defined by the "Glass Engineering Handbook" by E. B. Shand, McGraw Hill Book Company Ltd. (1958), the glass softening temperature is that temperature at which the glass has a viscosity of $10^8$ poise. Glass used for fluorescent lamps normally has a softening temperature in the range of 600°-670° C.

Preferably the phosphor suspension may include a phosphor bonding agent formed of finely pulverized aluminum oxide.

BRIEF DESCRIPTION OF THE DRAWINGS

The present invention will become more readily apparent from the following detailed description taken in conjunction with the accompanying drawings in which:

FIGS. 1 through 3 show one embodiment of an apparatus for manufacturing fluorescent lamps in accordance with the method of the present invention wherein FIG. 1 is a schematic longitudinal sectional view of a coating for forming a phosphor layer on the inner surface of glass bulbs with a filter unit; FIG. 2 is a perspective view of a baking unit for baking coated glass bulbs with parts cut away; and FIG. 3 is a somewhat enlarged perspective view of one portion of the transporting members for coated glass bulbs shown in FIG. 2;

Throughout the drawing figures, like reference numerals designate the identical or corresponding components.

DESCRIPTION OF THE PREFERRED EMBODIMENTS

Figure 1:
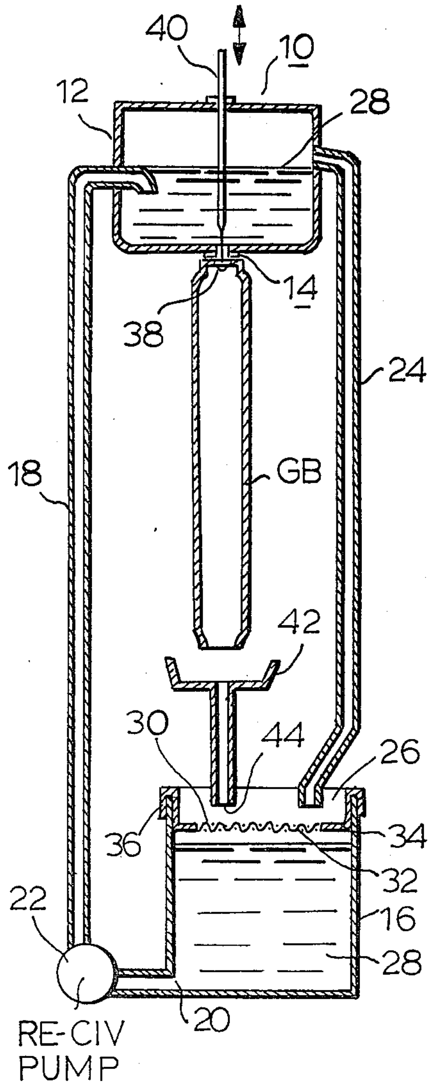

Where phosphor layers have been formed of aqueous phosphor suspensions with binders prepared from polyethylene oxides or fatty acid esters thereof and baked at a temperature less than a conventional one, there have been investigations and discussions on why phosphor layers or coatings have weak adhesions to the glass surface. As a result, it has been found that the weak adhesions result from the following two causes:

Namely, the first cause is that the above-mentioned phosphor suspensions are very strong in their bubbling property. Consequently, a multiplicity of minute bubbles are generated in the phosphor suspension in the step of coating the glass surface with the phosphor suspension while the suspension is recirculating through a coating device involved. The resulting phosphor coating becomes coarse due to the influence of those bubbles and adsorption forces between phosphor particles and between the phosphor particles and the glass surface become extremely weak. As the second cause, it has been seen that, with the baking effected at a temperature near the softening temperature of glass of not less than 600° C., as in the prior art practice, an alkaline metal alkali component included in the glass is diffused into the phosphor coating from the glass surface to act to increase the adhesion between the phosphor particles and between the phosphor particles and the glass surface whereas the diffusion of the alkali metal is very small at temperatures of not higher than 550° C. and the action of increasing the adhesion is scarcely performed.

From the foregoing it is conjectured that, if phosphor coatings are formed according to a method of suppressing the bubbling as much as possible by adding preliminarily an alkali metal to the extent that it would be diffused from glass during the conventional baking step to the phosphor suspension using a polyethylene oxide or a fatty acid ester thereof as a binder, even when the baking is at a temperature less than the conventional temperature, phosphor coatings can be formed having the adhesion strength equal to that previously obtained by higher temperature baking.

Generally speaking, however, fluorescent lamps, when the alkali metal is included therein, have the tendency to form an amalgam with mercury during the lighting of the lamps resulting in a decrease in lumen maintenance. Therefore, it is desirable that the alkali metal introduced into phosphor coatings is a compound inactive with mercury as far as possible.

There have been discussed a variety of alkali compounds meeting the requirement as described above. As result, it has been found that compounds in the form of phosphates or borates have the least adverse influence on the lumen maintenance.

By considering the foregoing, there has been prepared a phosphor suspension used with the present invention as follows: 100 kg of calcium halophosphate forming a white phosphor, and 1 kg of aluminum oxide powder having a mean particle size of 0.05$\mu$ are suspended in 150 l of 3% aqueous solution of a polyethylene oxide having a mean molecular weight of five hundred thousand with 100 g of polyethylene oxide-nonylphenyl ether added as a surface active agent, followed by sufficient agitation. Added to this is 300 g of sodium hexamethaphosphate [$(NaPO_3)_6$] to thereby prepare a phosphor suspension which is simply called hereinafter the suspension. The suspension may include a binder as will be described later.

Referring now to FIG. 1 of the drawings, there are illustrated the coating and filter units to be described. The arrangement illustrated comprises a coating unit generally designated by the reference numeral 10 including an upper tank 12 in the form of a cylindrical box having an open top surface and centrally provided at the bottom with a coating nozzle generally designated by the reference numeral 14 and a lower tank 16 in the form of a cylindrical box having an open top surface and disposed below the upper tank 12 to form a predetermined spacing therebetween. A connecting pipe 18 from the lateral wall of the upper tank 12 extends downward to communicate with a supply port 20 disposed on the lateral wall of the lower tank 16 at the bottom and includes a recirculating pump 22 therein. Also shown is an overflow pipe 24 which extends downward from the lateral wall of the upper tank 12 to open in a receiving port 26 disposed on the open top surface of the lower tank 16. The overflow pipe 24 serves to always maintain a predetermined constant volume of a phosphor suspension 28 as described above within the upper tank 12.

A filter unit generally designated by the reference numeral 30 is detachably disposed in the receiving port 26 of the lower tank 16. The filter unit 30 includes a filter 32 having meshes of from 50 to 200$\mu$, a peripheral portion 34 fixed to the peripheral edge of the filter 32 to abut against the inside of the receiving port 26 and a plurality of hangers 36 disposed on the peripheral portion 34 to be removably engaged by the upper edge of the receiving port 26.

In FIG. 1 an elongated glass bulbs GB open at both ends is shown as being disposed between the spacing between the upper and lower tanks 12 and 16 and just under the coating nozzle 14 while the longitudinal axis is located vertically and the upper end of the glass bulb GB as viewed in FIG. 1 is very close to the bottom of the upper tank 12.

A suspension guide 38 is operatively coupled to the coating nozzle 14 and shown in FIG. 1 as being located within the upper open end of the glass bulb GB.

In FIG. 1, a recovery trough 42 is shown as being disposed between the glass bulbs GB and the lower tank 16 and including a flow-down port 44 opening in the receiving port 26 of the lower tank 16 for the purpose as will be apparent hereinafter. The trough 42 runs in a direction in which the glass bulb GB is transported in the spacing between the upper and lower tanks 12 and 16 respectively.

Figure 2:
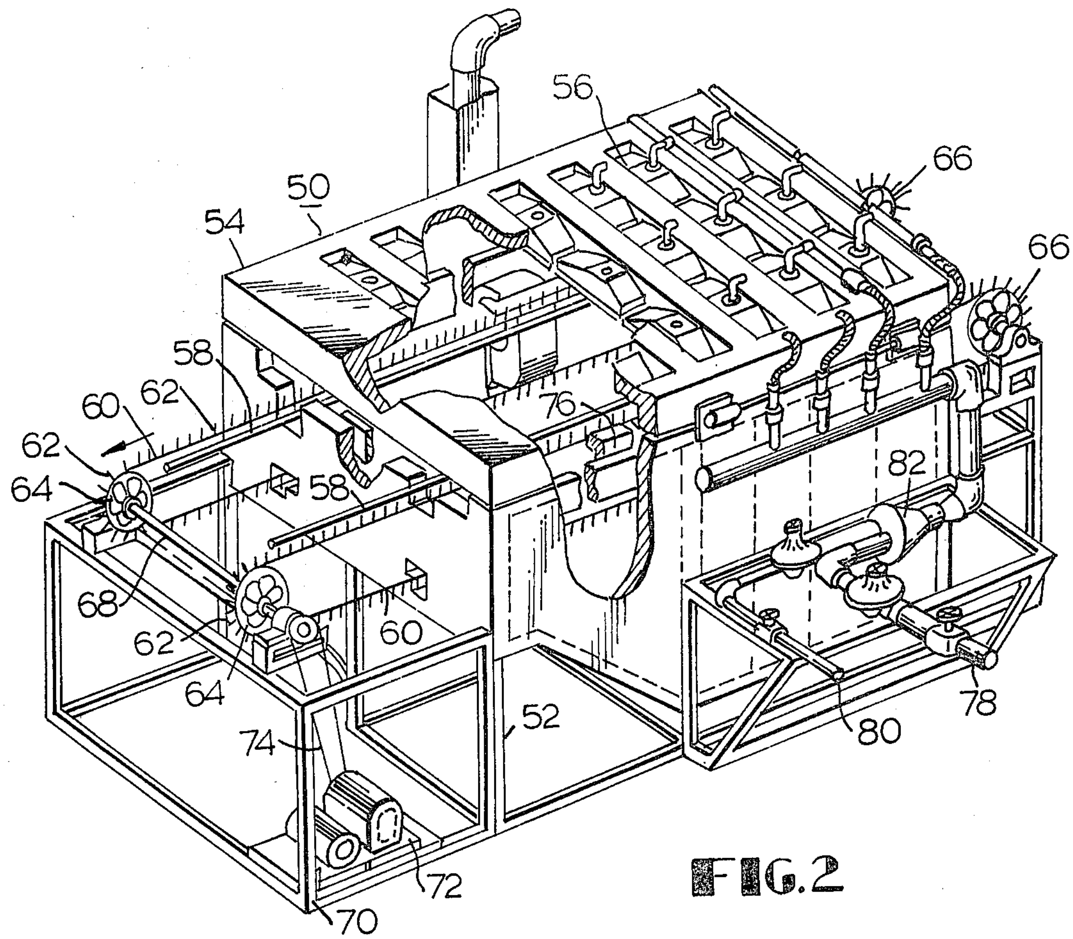
Figure 3:
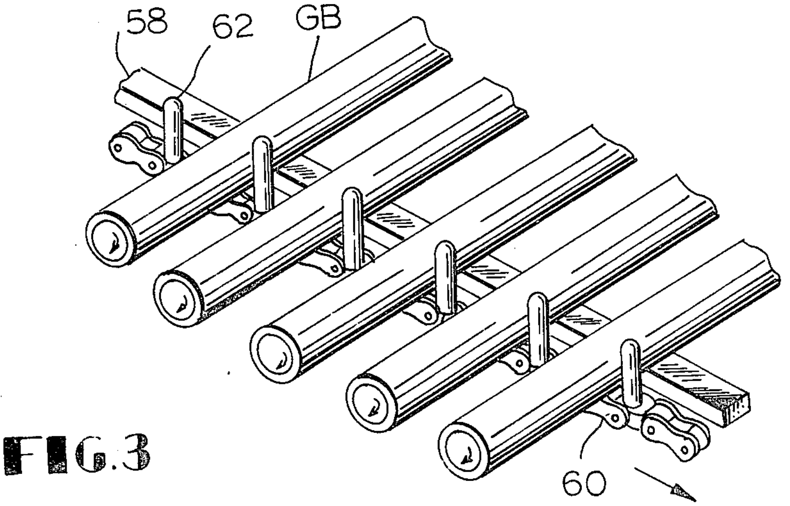

In FIG. 2, the baking unit used with the method according to the present invention is generally designated by the reference numeral 50 and comprises a main body 52 and a heating furnace 54 formed of a plurality of radiation type gas burners 56 arranged so as to cover the upper surface as viewed in FIG. 3 of the main baking body 52. A pair of guide rails 58 is disposed in spaced parallel relationship so as to extend horizontally through the heating furnace 54 with both ends thereof protruding beyond the adjacent ends of the heating furnace 54. The guide rails 58 are formed of a heat resisting material, alternatively, the guide rails 58 may include surfaces coated with a heat resisting material. A chain-shaped endless conveyor 60 is disposed on the outside of each guide rail 58 substantially parallel thereto and forms a predetermined small spacing therebetween. Each of the endless conveyors 60 includes a plurality of guide tips 62 planted at predetermined equal intervals thereon to project above the associated guide rail 58 for the purpose as will be apparent later as shown best in FIG. 3. The endless conveyors 60 can be formed of the same material as the guide rails 58. Alternatively, they may be coated with such a material.

The purpose of forming entirely or partly each of the guide rail 58 and the endless conveyor 60 on such a material is to decrease the quantity of heat required for coating glass bulbs with the phosphor layer.

Each of the endless conveyors 60 is trained over a pair of spaced sprocket wheels 64 and 66 located on both end portions of the baking unit 50 to be aligned with each other lengthwise of the guide rails 58. The pair of sprocket wheels 64 disposed in the lefthand end portion as viewed in FIG. 2 of the baking unit 50 are interconnected through a rotary shaft.

Each of the endless conveyors 60 is spanned between a pair of sprocket wheels 64 and 66 located on both end portions of the baking unit 50 to be aligned to each other in the direction of the guide rails 58. The pair of sprocket wheels 64 disposed on the lefthand end portion as viewed in FIG. 2 of the baking unit 50 are interconnected through a rotary shaft 68 rotatably supported by a pair of spaced bearings fixed on a supporting framework 70 connected to the lefthand side as viewed in FIG. 2 of the main baking body 52 and on the outside of the sprocket wheels 64. The rotary shaft 68 extends through the lefthand bearing as viewed in FIG. 2 and the end portion thereof extending beyond that bearing is operatively coupled to a driving mechanism 72 disposed at the bottom of the supporting framework 70 at one corner located nearly below the protruding end of the rotary shaft 68 through a torque transmitting endless belt 74 trained over the end of the rotary shaft 68 and a rotary shaft of the driving mechanism 72.

When operated, the driving mechanism 72 moves the pair of endless conveyors 60 in a synchronized relationship in the direction of the arrow shown in FIG. 2 through the endless belt 74, the rotary shaft 68 and the two sprocket wheels 64 with the sprocket wheels 66 operated as idle members.

It will readily be understood that the guide tips 62 on each of the endless conveyors 60 are substantially aligned with those on the other conveyor 60 in a direction perpendicular to the common longitudinal axis of the guide rails 58 respectively.

The main baking body 52 includes an inner blower 76 for successively introducing a predetermined gas into coated glass bulbs GB movably disposed on the guide rails 58 and held by the respective guide tips 62 (see FIG. 3) for the purpose of promoting the baking of the phosphor layers coated on the glass bulbs GB. The main body 52 also includes a fuel supply pipe 78 and an air supply pipe 80 communicating with the burners 56 through a mixer 82. A combustible gas from the fuel supply pipe 78 is mixed with low pressure air from the air supply pipe 80 in the mixer 82 and then a mixture thereof is supplied to the burners 56 where it is burnt.

The method of the present invention will now be described with reference to the arrangement as shown in FIGS. 1 through 3. Also the operation of the arrangment will readily understood as the description proceeds.

An amount of a phosphor suspension prepared as described above is charged in the lower tank 16 through the filter 32 of the filter unit 30. Then the recirculating pump 22 is operated to deliver the phosphor suspension 28 accumulated within the lower tank 16 to the upper tank 12 through the supply port 22, the pump 22 and the connecting pipe 18 until the suspension 28 is charged at its level as determined by the open end of the overflow pipe 24 within the upper tank 12.

Under these circumstances a glass bulb to be coated is transported into the spacing between the upper and lower tanks 12 and 16 by an intermittently operated conveyor (not shown) and stopped so as to be located just under the coating nozzle 14 as shown in FIG. 1. At that time, the coating nozzle 14 is opened for a predetermined time interval under the control of the operating rod 40. This permits a predetermined constant volume of the suspension 28 to pass through the nozzle 14 and flow down along the inner surface of the glass bulb GB with the help of the suspension guide 38. This results in the formation of a phosphor layer (not shown) on the inner surface on the glass bulb GB. The surplus suspension 28, after travelling through the glass bulb GB, is recovered by trough 42 disposed on the lower end of the glass bulb GB. The surplus suspension 28 then flows onto the filter 32 from the flow-down hole 44 connected to the recovery trough 42. At that time, bubbles may be generated on the filter 32.

However, if the filter 32 is a netting formed of stainless steel or a plastic having meshes of from 50 to 200$\mu$ as described above, then the bubbles halt on the filter 32 without passing therethrough until the bubbles disappear spontaneously. If the filter 32 is formed of a netting having meshes of not greater than 50$\mu$ then phosphor particles in the suspension 28 have difficulty passing therethrough. Further more using a mesh of not less than 200$\mu$ causes a problem in that the bubbles generated can not be completely removed from the suspension 28 as it passes through the filter 32.

The glass bulb GB thus coated with the phosphor layer is transported to the baking unit 50 as shown in FIG. 2 by any suitable means while at the same time the next succeeding glass bulb GB is moved so as to be located just under the now closed coating nozzle 14 by the conveyor as described above. The glass bulb now located under the coating nozzle 14 is then coated with suspension 28 in the same manner as the just preceding glass bulb GB and then is transported to the baking unit 50.

The process as described above is repeated to coat the successive glass bulbs with the suspension 28 one after another and then transport the coated glass bulbs to the baking unit in succession.

On the other hand, the baking unit 50 is operated so that the pair of endless conveyors 60 with the guide tips 62 are moved in the direction of the arrow (see FIG. 2) at a predetermined constant speed by the driving mechanism 72 through the components 74, 68 and 64 while the guide tips 62 on each endless conveyor 60 are aligned with those on the other endless conveyor 60 in the direction perpendicular to the direction of movement of the conveyors. The gas burners 56 burn the mixture of combustible gas and air supplied thereto through the mixer 82 to maintain regions around the two guide rails 58 overlaid with the burners 56 at a predetermined temperature of at least 450° C.

When the glass bulbs GB which have been coated with the suspension 28 successively reach the baking unit 50, the end portions of the glass bulbs GB are successively placed on the pair of spaced rails in parallel on the side of the idle sprocket wheels 66. At that time, those end portions of the glass bulbs GB are located between the respective pairs of adjacent guide tips 62 on the same endless conveyors 60 and rotatably supported by those pairs of aligned guide tips 62 on different conveyors 60 located just down stream of the associated glass bulbs GB in the direction of the movement of the endless conveyors 60 as shown in FIG. 2. The glass bulbs GB thus put on the guide rails 58 are moved toward the interior of the heating furnace 54 by the endless conveyors 60 while rotating about the axes thereof due to the interaction of the mating guide tips 62 and the guide rails 58.

During their passage through the heating furnace 54, the glass bulbs are heated to a temperature of at least 450° by the gas burners 56 and maintained at that temperature for thirty seconds. This results in the volatization and removal of the polyethylene oxide, used as the binder and contained in the phosphor layer on the inner surface of each glass bulb GB. At that time, the operation of forming the phosphor layer on the inner surface of the glass bulbs by baking it is completed.

From the foregoing it is seen that the filter unit 30 removes minute bubbles generated in the suspension 28 and still the alkali compound added, as the adhesion reinforcing agent, to the suspension 28 enhences the adhesion of the phosphor particles to the glass surface so that, even if a polyethylene oxide or a fatty acid ester thereof is used as a binder, (the use thereof requiring a far less decomposition temperature than conventional binders), and if the glass bulb is baked at a temperature which is not higher than the softening temperature of the glass bulb GB, it is nonetheless possible to suppress a decrease in the adhesion of the phosphor particles to the glass surface. Accordingly, it is possible to reduce the fuel (gas) cost for forming the phosphor coating to a great extent without decreasing the lamp quality and product yields during the manufacturing steps. The reduction in fuel cost is attributed partly to the rotation of the glass bulbs.

In order to demonstrate the result thereof, the method of the present invention has been compared with conventional methods as to the fraction of defective bulbs due to the exfoliation of phosphor layers and the amount of consumption of energy. The result of the comparison is listed in the following Table I. In Table I Invention [1] is the same as the above-mentioned embodiment and also Inventions [2] through [4] include alkali salts and binders whose types are changed and whose combination is varied. Also Invention [4] is not added with a phosphor bonding agent.

TABLE I

| | Bakg. furnace | Bakg. temp. | Binder | Bond agent & added amt. (rel. to phos.) | Adhesion reinforc. agent & added amt. (rel. to phos.) | Fractn defc. due to exfol. of phos. | Qty of energy cons. in bakg. step |
|---|---|---|---|---|---|---|---|
| CONV. METHOD [1] | Roller syst. | 650° C. | Nitro-cellulose | Al oxide 0.5 wt % | | 0.25% | 200 Kcal/bulb |
| CONV. METHOD [2] | Roller syst. | 450° C. | Poly-ethylen oxide | Al oxide 0.5 wt % | | 8.00% | 180 Kcal/bulb |
| INVENTION [1] | No Roller | " | Poly-ethylen oxide | Al oxide 0.5 wt % | Sod. meta-phosphate 0.03 wt % | 0.20% | 70 Kcal/bulb |
| INVENTION [2] | No Roller | " | Poly-ethylen oxide | Al oxide 0.5 wt % | Sod. borate 0.03 wt % | 0.25% | 70 Kcal/bulb |
| INVENTION [3] | No Roller | " | Poly-ethylen oxide acetate ester | Al oxide 0.5 wt % | Sod. meta-phosphate 0.03 wt % | 0.20% | 70 Kcal/bulb |
| INVENTION [4] | No Roller | " | Poly-ethylen oxide acetate ester | | Sod. meta-phosphate 0.03 wt % | 0.30% | 70 Kcal/bulb |

From Table I it is seen that the present invention decreases defects due to the exfoliation of the phosphor layer while simultaneously reducing energy consumption.

Examples of the phosphor bonding agent involve, in addition to aluminum oxide exemplified in Table I, phosphates of alkaline earth metals such as calcium pyrophosphate, a fine powder of barium sulfate, etc. Also examples of the adhesion reinforcing agent involve, in addition to sodium phosphate and sodium borate, phosphates and borates of alkalin metals other than sodium such as potassium phosphate and potassium borate, and mixtures thereof.

In Table I each of the adhesion reinforcing agents has been added to the phosphor in an amount of 0.03% on the basis of the weight of the phosphor, but if the effect that the adhesion is reinforced will result from the action of the alkali metal, as described above, then an amount of an alkali metal included in an added alkaline compound ought to concern the reinforcing effect.

Figure 4:
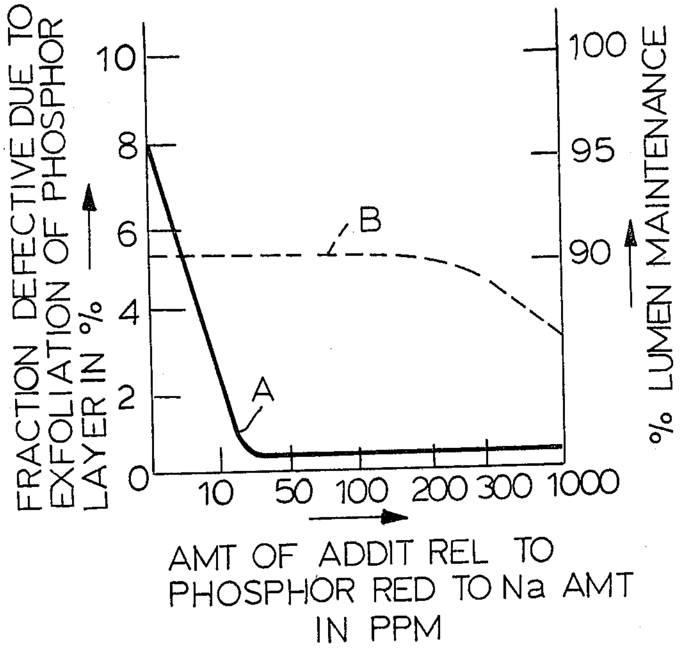
FIG. 4 is a graph illustrating a fraction defective due to the exfoliation of phosphor layers and a percentage lumen maintenance relative to an added amount of an adhesion reinforcing agent used with the method of the present invention.

FIG. 4 illustrates the fraction of defective bulbs (which is labelled the reference character A) due to the exfoliation of phosphor layers in the steps of manufacturing 40 watt fluorescent lamps according to the method of the present invention as described above and a percentage lumen maintenance (which is labelled the reference character B) after manufactured lamps have been lit for 1,000 hours with amounts of the phosphate and borate of sodium added differently changed with respect to the phosphor and given in ppm calculated in terms of an amount of sodium.

From FIG. 4 it is seen that, the adhesion reinforcing effect is not sufficient with a proportion of addition less than 15 ppm and also the lumen maintenance is adversely affected when 200 ppm is exceeded. Furthermore, the initial brightness remains substantially unchanged with an added amount not greater than 1,000 ppm.

The result approximating the foregoing has also been obtained with phosphates or borates or alkali metals other than sodium. Furthermore, as a result of detailed experiments conducted with those compounds, it has been seen that vitreous sodium polymetaphosphate is most conspicuous in its adhesion reinforcing effect.

As described above, the present invention is to coat glass bulbs with a phosphor suspension including a adhesion reinforcing agent while its bubbling is suppressed to the utmost and to heat the glass bulbs coated with that suspension at a relatively low temperature to form phosphor layers. However, by taking means for recirculating the suspension so that, as described above, the suspension 28 within the upper tank 12 which has been supplied from the lower tank 16 in the coating unit 10, is caused to flow down within each of the glass bulbs GB, the surplus suspension 28 being passed through the filter unit 30 above the lower tank 16 along with the suspension 28 flowing down from the overflow tube 24 and the suspension 28 deprived of bubbles by the filter 32 is again supplied to the upper tank 12 from the lower tank 16, the suspension 28 is consumed and its amount decreases. This increases a head between the filter 32 and the level of the suspension 28 in the lower tank 16 and when the suspension 28 deprived of the bubbles by the filter 32 is recovered in the lower tank 16, bubbles again occur at and below its level.

Figure 5:
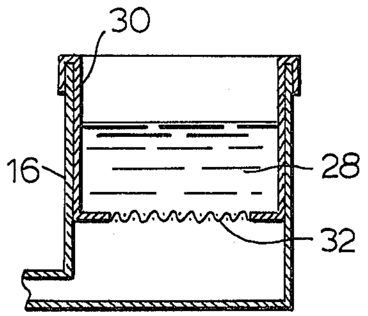
FIG. 5 is a longitudinal sectional view of the lower tank shown in FIG. 1 and illustrating the filter unit at a position which is different from that shown in FIG. 1.

In order to avoid this problem, the filter 32 can sink in the suspension 28 within the lower tank 16 to be close to the bottom of the latter but put above the supply port 22 by lengthening the peripheral portion 34 and the hangers 36 as shown in FIG. 5. In the arrangement illustrated, when the surplus of the suspension 28 from the flow-down port 44 and the suspension 28 from the overflow pipe 24 fall on the suspension 28 within the lower tank 16, bubbles may be generated at and below at the level of the suspension 28 but the filter 32 prevents such bubbles from reaching the vicinity of the bottom of the lower tank 16 and hence the support port 20. This ensures that the bubble removing effect can be attained.

Figure 6:
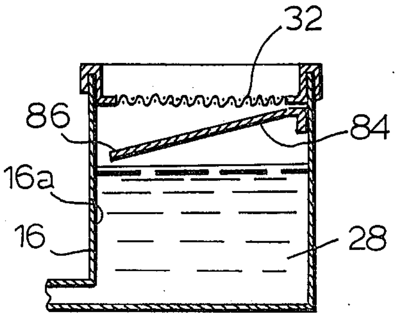
FIG. 6 is a view similar to FIG. 5 but illustrating a modification of the filter unit shown in FIG. 1.

FIG. 6 shows a modification of the filter unit 30 shown in FIG. 1. In the arrangement illustrated a guide plate 84 is disposed at a tilt with respect to the filter 32 above the level of the suspension 28 and below the filter 32 by having one end thereof connected to the peripheral edge of the filter 32 on the lower side and the all the peripheral edge thereof abutting in liquid proof relationship against the inner wall 16*a* of the lower tank 16 excepting that the diametrically opposite end 86 of the guide plate 84 is at the lowermost position and terminates short of both the adjacent portions of the inner wall 16*a* and the level of the suspension 28.

In the arrangement of FIG. 6, the suspension 28 passed through the filter 32 flows along the inner wall 16*a* of the lower tank 16 and the guide plate 84 until the same is introduced into the suspension 28 within the lower tank 16 over the lowermost end 86 of the guide plate 84. Even if a distance between the filter 32 and the level of the level of the suspension 28 is large, then the suspension 28 from the filter 32 is prevented from directly falling on the surface of the suspension 28 within the lower tank 16. This enhances the bubble removing effect.

Figure 7:
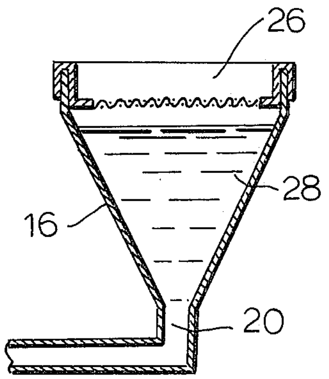
FIG. 7 is a view similar to FIG. 5 but illustrating a modification of the lower tank shown in FIG. 1.

FIG. 7 shows a modification of the lower tank 16 shown in FIG. 1. The arrangement illustrated is different from that shown in FIG. 1 only in that in FIG. 7, the receiving port 26 is greater in diameter than the bottom of the lower tank 16. In FIG. 7, that portion of the lower tank 16 located below the filter 32 is shown as being in the form of an inverse cone connected at the vortex portion to the supply port of the connecting pipe 20 extending vertically and then horizontally.

In the arrangement of FIG. 7, the phosphor in the suspension 28 is prevented from depositing at the bottom of the lower tank 16 resulting in making it unnecessary to agitate the suspension 28. Therefore, the generation of bubbles due to the agitation can be prevented.

Figure 8:
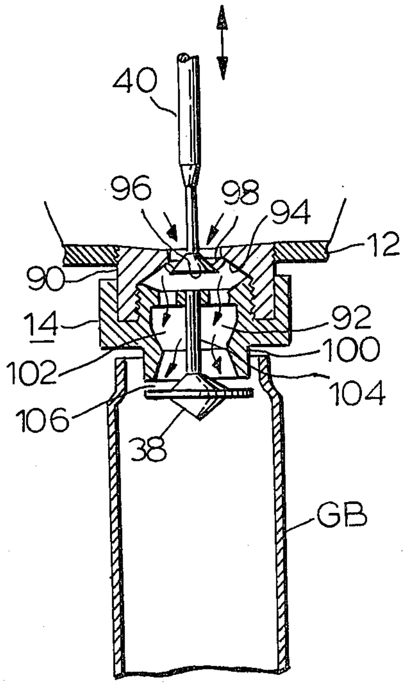
FIG. 8 is a fragmental longitudinal sectional view of a modification of the coating nozzle shown in FIG. 1.

FIG. 8 shows a modification of the coating nozzle 14 shown in FIG. 1. The arrangement illustrated comprises a main nozzle body 90 screw threaded in place into the bottom of the upper tank 12, a flow passageway 92 for the suspension 28 extending centrally through the main nozzle body 90, and an opening and closing valve formed of a valve seat 94 disposed on an upper peripheral edge of the main nozzle body 90 to project toward the flow passageway 37 an opening closing valve body 96 disposed on the lower side of the valve seat 94 to form a predetermined spacing therebetween and a packing 98 in the form of an O-ring formed of an elastic material, and interposed between the valve seat 94 and the valve body 96. The valve body 96 is connected at the center of the upper portion to an operating rod 40 which extends through the upper tank 12 and includes the upper end as viewed in FIG. 8 connected directly to a driving cam (not shown). When the driving cam is operated to move the operating rod 40 in the upward direction as viewed in FIG. 8 to cause the packing 98 to abut against the valve seat 94, the valve body 96 blocks the flow passageway 92 with the result that the suspension 28 is prevented from entering the flow passageway 92.

A sleeve 100 is screw threaded into the lower portion as viewed in FIG. 8 of the main nozzle body 90 to be spaced from the valve body 96 and to form a suspension reservoir portion 102 therein. This reservoir portion 102 serves to accumulate temporarily that portion of the suspension 28 from the upper tank 12 entered thereinto through the spacing formed between the valve seat 94 and the valve body 96 as shown at the arrows in FIG. 8. A supporting member 104 in the form of a rod is coaxially disposed within the sleeve 100 by having its upper end as viewed in FIG. 8 connected suitable to the adjacent end of the sleeve 100 and hangs the suspension guide 38. The suspension guide 38 is arranged to resiliently push the inner wall of the sleeve 100 and is shown in FIG. 8 as including a pair of cones interconnected back to back with a disc interposed therebetween. The suspension guide 38 has a diameter not less than the inside diameter of the sleeve 100 and forms a suspension injection port 106 between the lower end of the sleeve 100 and the adjacent side of the same. The injection port 106 opens radially and preferably has an axial spacing of from 1 to 2 millimeters.

It has been found that, by putting the valve body 96 and therefore the opening and closing valve 94-96-98 in its closed position at a closing speed of 5 mm/sec, the air is completely prevented from the inflow through the injection port 106 resulting in the perfect removal of bubbles.

In the arrangement of FIG. 8, the suspension is replete in a space within the coating nozzle 14 defined by both the valve body 96 and the suspension injection port 106 when the valve 94-96-98 is in its closed position and serves to absorb variations in volume of the suspension. Therefore, the suspension is smoothly injected via the injection port 106 into the glass bulb GB located just under the coating nozzle 14 to form a uniform phosphor layer on the inner surface thereof completely free from bubbles. This is because the suspension, deprived of bubbles by the filter unit 30, is smoothly injected into the glass bulb through the injection port without bubbles generated.

Figure 9:
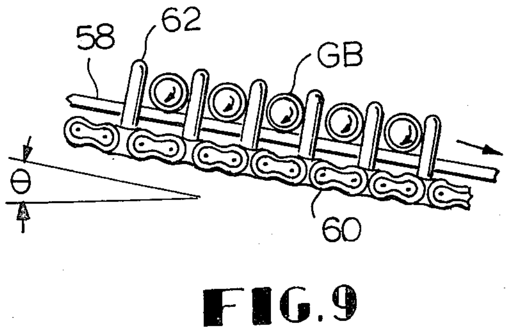
FIG. 9 is a fragmental side elevational view of a modification of the arrangement shown in FIG. 3.

The arrangement illustrated in FIG. 9 is different from that shown in FIG. 3 only in that in FIG. 9, the guide rails 58 and therefore the endless conveyors 60 are tilted at a predetermined angle $\theta$ (see FIG. 9) to the horizon so as to be gradually lowered in the direction of movement of the conveyors 60. This measure permits the coated glass bulbs GB to tumble down along the guide rails 58 while they follow up the contacting guide tips 62 in their naturally falling state. Therefore, the glass bulbs GB can be uniformly heated and an excessive force is not exerted on each of the glass bulbs GB. This results in the prevention of the exfoliation of the phosphor layers caused from such an excessive force, and the prevention of easy breakage of the glass bulbs due to the occurrence of cracks on the surface of the glass bulbs also caused from the application of excessive force, etc.

However, if the guide rail 58 has the tilted angle $\theta$ in excess of 20 degrees to the horizon, then each of the glass bulbs has an excessively high falling speed and strongly collide against the mating guide tip 62, resulting in an increase in exfoliation of the phosphor layers. Further, the glass bulbs GB come to press against their respective guide tips 62. Therefore, the automated movement of the glass bulbs is not effected.

In order to give the similar result as described above in conjunction with FIG. 9, a contact resistance between each of the guide tip and the glass bulb GB contacted thereby may be smaller than that between the guide rail 58 and that glass bulb GB.

Figure 10:
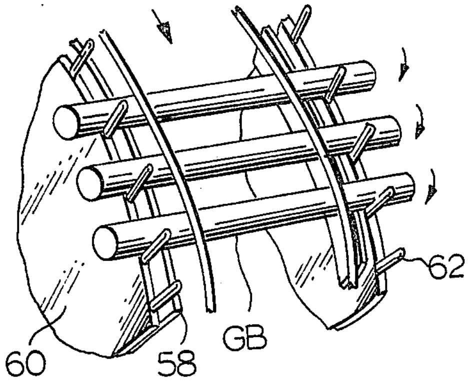
FIG. 10 is a fragmental perspective view of another modification of the arrangement shown in FIG. 3.
Figure 11:
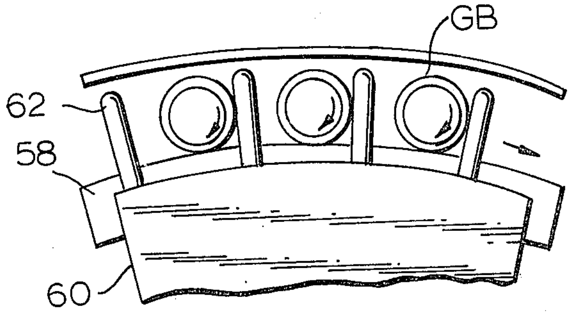
FIG. 11 is a fragmental side elevational view of the arrangement shown in FIG. 10.

FIGS. 10 and 11 show another modification of the arrangement shown in FIG. 3. The arrangement illustrated is different from that shown in FIG. 3 only in that in FIGS. 10 and 11, the guide rail 58 is formed into a circular arc and the endless conveyor 60 is replaced by a rotating disc 60 with guide tips 62.

The arrangement results in a small-sized baking unit 50.

Figure 12:
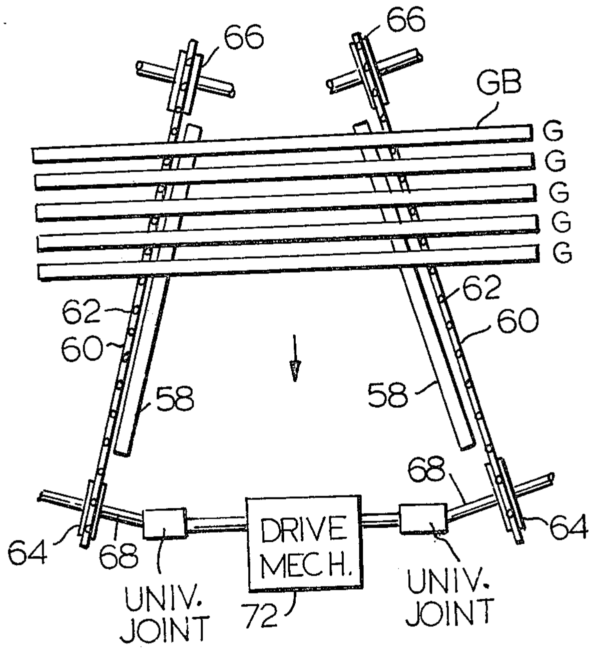
FIG. 12 is a plan view of still another modification of the arrangement shown in FIG. 3 with a modification of the driving mechanism therefor shown in FIG. 2.

In the arrangement illustrated in FIG. 12, the guide rails 58 and therefore the endless conveyors 60 are flared in the direction of the movement of the conveyors 60 as shown at the arrows in FIG. 12. That is, spacing between the guide rails 58 and therefore, the endless conveyor 60, is gradually broader toward the sprocket wheels 64 or in the direction of movement of the glass bulbs GB. The driving mechanism 72 is located midway between the sprocket wheels 64 and includes a pair of driving shafts extending from both sides thereof to be connected to the rotary shafts 68 for the sprockets wheels 64 through universal joints respectively.

In other respects the arrangement is substantially identical to that shown in FIG. 2.

In the arrangement of FIG. 12, the glass bulbs GB are transported while positions thereof abutting against the guide rails 58 and the associated guide tips 62 depict spiral loci. As a result, the guide rails 58 and the guide tips 62 are prevented from abutting continuously against the associated glass bulb GB at the same points resulting in a great reduction in defects due to the exfoliation of phosphor layers caused by the glass bulbs always receiving impacts at the same points. Also, the glass bulbs GB have reduced cracks and residual strain and therefore have decreased breakage. If desired, the guide rails 58 and the endless conveyors 60 may be flared in the direction opposite to that shown in FIG. 12. That is, the spacing between the guide rails 58 may be gradually narrower in the direction of movement of the endless conveyors 60 or of the glass bulbs GB.

In the arrangements shown in FIGS. 3, 9, 10 and 11 guide rails 58 are preferably laid so that, when each of the glass bulbs GB has been heated by the heating furnace 54 to reach a maximum temperature, the guide rails 58 support that glass bulb GB at the points spaced from both ends of the glass bulb GB by a distance equal to one quarter of the entire length thereof. This is effective for preventing the deformation of the glass bulb GB when it has been about to be softened and deformed.

From the foregoing it is seen that the present invention provides a method of forming fluorescent lamps comprising the steps of coating a glass bulb with a phosphor suspension prepared by adding a phosphor and an adhesion reinforcing agent or that adhesion reinforcing agent and a phosphor bonding agent to an aqueous solution of a polyethylene oxide or a fatty acid thereof, after the phosphor suspension has passed through a filter to remove bubbles, and baking the phosphor layer coated on the glass bulb at a temperature which is not higher than the softening temperature of the glass bulb. Therefore, the fuel cost in the baking step can be sharply reduced without both the deterioration of the quality of the resulting lamps and a decrease in yield in each of the manufacturing steps.

While the present invention has been illustrated and described in conjunction with several preferred embodiments thereof, it is to be understood that numerous changes and modifications may be resorted to without departing from the spirit and scope of the present invention. For example, the filter unit shown in FIG. 1, 5 or 6 may be disposed in the upper tank or each of the upper and lower tanks.

What we claim is:

1. A method of manufacturing a fluorescent lamp comprising the steps of preparing a phosphor suspension by adding to an aqueous solution of a polyethylene oxide or a fatty acid ester, a phosphor and an adhesion reinforcing agent consisting of a phosphate and/or a borate of an alkali metal, passing said phosphor suspension through a filter having meshes of from 50 to 200μ, injecting and coating on the inner surface of a glass bulb said phosphor suspension passed through said filter to form a phosphor layer thereon, and heating and baking said phosphor layer on said inner surface of said glass bulb at a temperature which is not higher than the softening temperature of the glass of said glass bulb while supporting one portion of said glass bulb, said softening temperature being that temperature at which said glass has a viscosity of $10^8$ poise.

2. A method of manufacturing a fluorescent lamp as claimed in claim 1, wherein said phosphor suspension includes said adhesion reinforcing agent in an amount of from 15 to 200 ppm calculated in terms of an amount of sodium with respect to said phosphor.

3. A method of manufacturing a fluorescent lamp as claimed in claim 1, wherein said adhesion reinforcing agent comprises a vitreous sodium polymetaphosphate.

4. A method of manufacturing a fluorescent lamp comprising the steps of preparing a phosphor suspension by adding to an aqueous solution of a polyethylene oxide or a fatty acid ester thereof, a phosphor, an adhesion reinforcing agent consisting of a phosphate and/or a borate of an alkali metal, and a phosphor bonding agent, passing said phosphor suspension through a filter having meshes of from 50 to 200μ, injecting and coating on the inner surface of a glass bulb said phosphor suspension passed through said filter to form a phosphor layer thereon, and heating and baking said phosphor layer on said inner surface of said glass bulb at a temperature which is not higher than the softening temperature of the glass of said glass bulb while supporting one portion of said glass bulb, said softening temperature being that temperature at which said glass has a viscosity of $10^8$ poise.

5. A method of manufacturing a fluorescent lamp as claimed in claim 4, wherein said phosphor bonding agent comprises fine particles of aluminum oxide.

6. A method of manufacturing a fluorescent lamp as claimed in claim 4, wherein said phosphor bonding agent comprises a phosphate of an alkali earth metal.

7. A method of manufacturing a fluorescent lamp as claimed in claim 4, wherein said phosphor bonding agent comprises barium sulfate.

* * * * *